(12) United States Patent
Zhou

(10) Patent No.: US 10,735,494 B2
(45) Date of Patent: Aug. 4, 2020

(54) MEDIA INFORMATION PRESENTATION METHOD, CLIENT, AND SERVER

(71) Applicant: TENCENT TECHNOLOGY (SHENZHEN) COMPANY LIMITED, Shenzhen (CN)

(72) Inventor: Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 175 days.

(21) Appl. No.: 15/990,376

(22) Filed: May 25, 2018

(65) Prior Publication Data

US 2018/0278674 A1    Sep. 27, 2018

Related U.S. Application Data

(63) Continuation of application No. PCT/CN2017/082698, filed on May 2, 2017.

(30) Foreign Application Priority Data

May 5, 2016    (CN) .......................... 2016 1 0291337

(51) Int. Cl.
*G06F 15/16* (2006.01)
*H04L 29/08* (2006.01)
(Continued)

(52) U.S. Cl.
CPC ............ *H04L 67/06* (2013.01); *G06F 16/434* (2019.01); *G06F 16/5866* (2019.01);
(Continued)

(58) Field of Classification Search
CPC ............... G06F 16/434; G06F 16/5866; G06F 16/9535; G06F 16/9577; G06Q 30/0251;
(Continued)

(56) References Cited

U.S. PATENT DOCUMENTS

2006/0053109 A1    3/2006 Sudanagunta et al.

FOREIGN PATENT DOCUMENTS

CN    101432728    5/2009
CN    102868922    1/2013
(Continued)

OTHER PUBLICATIONS

International Search Report dated Aug. 11, 2017 in PCT/CN2017/082698 filed May 2, 2017. (With English Translation).

*Primary Examiner* — Liang Che A Wang
(74) *Attorney, Agent, or Firm* — Oblon, McClelland, Maier & Neustadt, L.L.P.

(57) ABSTRACT

A non-transitory computer-readable medium is provided. The medium stores a program executable by a processor of a client to receive an image file from a server and present the image file to a user of the client. In response to an operation performed by the user on the image file, a media information presentation request is sent to the server. A notification message of to-be-presented media information is received from the server. The notification message includes brief information of the to-be-presented media information. The brief information is presented to the user of the client. A media file presentation request is sent to the server in response to an operation performed by the user on the brief information. A link address of a media file is received from the server. The media file according to the link address is obtained and presented to the user of the client.

20 Claims, 13 Drawing Sheets

(51) Int. Cl.
*G06F 16/58* (2019.01)
*G06F 16/9535* (2019.01)
*G06F 16/957* (2019.01)
*G06F 16/432* (2019.01)
*H04L 29/06* (2006.01)
*G06Q 30/02* (2012.01)

(52) U.S. Cl.
CPC ...... *G06F 16/9535* (2019.01); *G06F 16/9577* (2019.01); *H04L 67/42* (2013.01); *G06Q 30/0251* (2013.01); *G06Q 30/0257* (2013.01); *H04L 67/02* (2013.01); *H04L 67/26* (2013.01)

(58) Field of Classification Search
CPC ..... G06Q 30/0257; H04L 67/02; H04L 67/06; H04L 67/26; H04L 67/42
USPC ........................................ 709/217, 218, 219
See application file for complete search history.

(56) References Cited

FOREIGN PATENT DOCUMENTS

| | | |
|---|---|---|
| CN | 104049836 | 9/2014 |
| CN | 105975581 | 9/2016 |

| Serial number | Type of a key word | Multiple layers of information corresponding to the key word | | |
|---|---|---|---|---|
| | | Layer 1 | Layer 2 | Layer 3 |
| 1 | Scene | Indoor | Office area | - |
| | | | Recreation area | - |
| | | Outdoor | High mountain | - |
| | | | Sea | - |
| | | | Grassland | - |
| | | | ... | - |
| 2 | Figure | Name | - | - |
| | | Age | - | - |
| 3 | Costume | Clothes | Color | - |
| | | | Dress | Longuette or skirt... |
| | | | Trousers | Ninth pants/pantskirt... |
| | | | Material | Chiffon/space cotton/real silk... |
| | | Shoes | High-heeled shoes | - |
| | | | Sports shoes | - |
| | | | Casual shoes | - |
| | | Bag | Crossbody bag | - |
| | | | Handbag | - |
| | | | ... | - |
| | | Accessory | Glasses | Sunglasses/mountaineering glasses... |
| | | | Necklace | - |
| | | | Bracelet | - |
| | | | Ring | - |
| | | | ... | - |
| 4 | Weather | Sunny/cloudy/mostly cloudy | - | - |
| | | Humidity | - | - |
| 5 | Geographical area | Nation | City | Scenery spot |

MEDIA INFORMATION PRESENTATION METHOD, CLIENT, AND SERVER

RELATED APPLICATION

This application is a continuation of International Application No. PCT/CN2017/082698, filed on May 2, 2017, which claims priority to Chinese Patent Application No. 201610291337.1, filed with the Chinese Patent Office on May 5, 2016, and entitled "MEDIA INFORMATION PRESENTATION METHOD, CLIENT, AND SERVER". The entire disclosures of the prior applications are hereby incorporated by reference in their entirety.

FIELD OF THE TECHNOLOGY

This application relates to media information presentation.

BACKGROUND OF THE DISCLOSURE

At present, various media information may be pushed when a user browses a website or browses information in an application (APP). For example: an advertisement in a form of a picture is inserted in a read article, or an advertisement in a form of a patch is inserted in a played video file. A manner of inserting a patch refers to that a video of media information lasting for a period of time is inserted at a front end of the video file, and the patch video is first played before the video file is played.

SUMMARY

This application provides a non-transitory computer-readable medium. The non-transitory computer-readable medium stores a program executable by a processor of a client to receive an image file from a server. The image file is presented to a user of the client. In response to an operation performed by the user on the image file, a media information presentation request is sent to the server. The media information presentation request includes an identifier of the image file. A notification message of to-be-presented media information is received from the server. The notification message is determined by the server according to the identifier of the image file. The notification message includes brief information of the to-be-presented media information. The brief information is presented to the user of the client. A media file presentation request is sent to the server in response to an operation performed by the user on the brief information. A link address of a media file is received from the server. The media file is associated with the media file presentation request. The media file according to the link address is obtained and presented to the user of the client.

This application further provides a media information presentation method that is applied to a server. An image file is sent to a client for presentation to a user of the client; A media information presentation request including an identifier of the image file is received from the client. To-be-presented media information is determined according to the identifier of the image file. A notification message of the to-be-presented media information is sent to the client. The notification message includes brief information of the to be presented media information. A media file presentation request is received from the client when the user performs an operation on the brief information. A link address of a media file that is associated with the media file presentation request is generated. Further, the link address of the media file is sent to the client. The media file is obtained by the client according to the link address for presentation to the user of the client.

This application further provides a server, including processing circuitry. The processing circuitry is configured to send an image file to a client for presentation to a user of the client and receive, from the client, a media information presentation request including an identifier of the image file. The processing circuitry is configured to determine to-be-presented media information according to the identifier of the image file and send, to the client, a notification message of the to-be-presented media information. The notification message includes brief information of the to-be-presented media information. The processing circuitry is configured to receive a media file presentation request from the client when the user performs an operation on the brief information and generate a link address of a media file that is associated with the media file presentation request. The processing circuitry is configured to send the link address of the media file to the client. The media file is obtained according to the link address for presentation to the user of the client.

BRIEF DESCRIPTION OF THE DRAWINGS

To describe the technical solutions in the embodiments of this application more clearly, the following briefly introduces the accompanying drawings required for describing the embodiments. The accompanying drawings in the following description show merely some embodiments of this application, and a person of ordinary skill in the art may still derive other drawings from these accompanying drawings.

FIG. 3 is a schematic diagram of a classification list of key words according to an embodiment of this application;

DESCRIPTION OF EMBODIMENTS

The following describes the technical solutions in the embodiments of this application with reference to the accompanying drawings in the embodiments of this application. The described embodiments are some but not all of the embodiments of this application. All other embodiments obtained by a person of ordinary skill in the art based on the embodiments of this application shall fall within the protection scope of this application.

In a process of implementing the embodiments of this application, the inventor finds that manners for presenting media information for the moment are much direct, and the media information are presented to a user without being selected or allowed by the user. Therefore, user experience is damaged, and resource utilization of a presentation apparatus is reduced.

In view of this, this application provides a media information presentation method, a client, and a server that can improve the user experience when the media information is presented and the resource utilization of the client.

In an embodiment of this application, the media information is promotion information and is different from a common video file such as a film or a television drama. The media information may be a native advertisement provided by an advertiser, that is, an advertisement video that is not relevant to other media files, and is aimed at promoting a product. Alternatively, the media information is another video file aimed at promoting or broadcasting, such as news or a public service trailer. In this embodiment of this application, promotion of this type of media information is combined with content of other common media files. relevant media information is pushed to the user after the user browses the other common media files.

Figure 1:
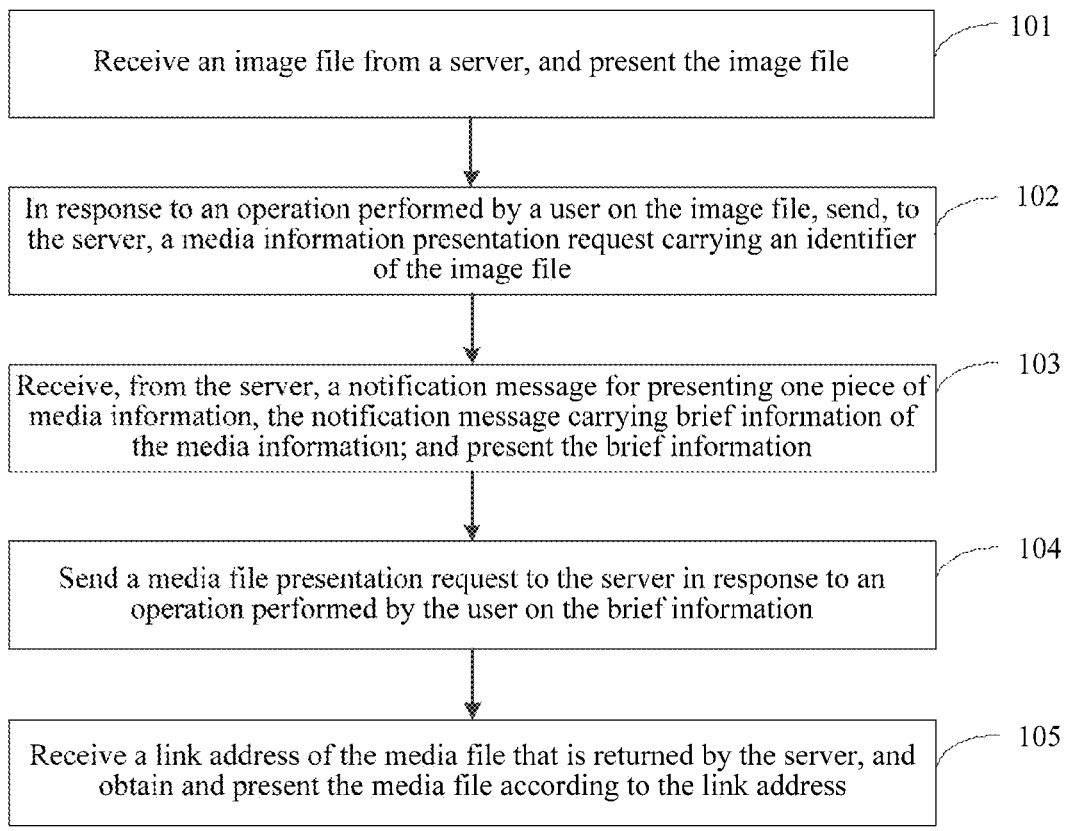
FIG. 1 is a schematic flowchart of a media information presentation method according to an embodiment of this application.

FIG. 1 is a schematic flowchart of a media information presentation method according to an embodiment of this application. The method is applied to a client. Referring to FIG. 1, the method includes steps of 101 to 105, as an exemplary embodiment.

In step 101, one or more image files are received from a server, and the image files are presented to a user of client.

Figure 2:
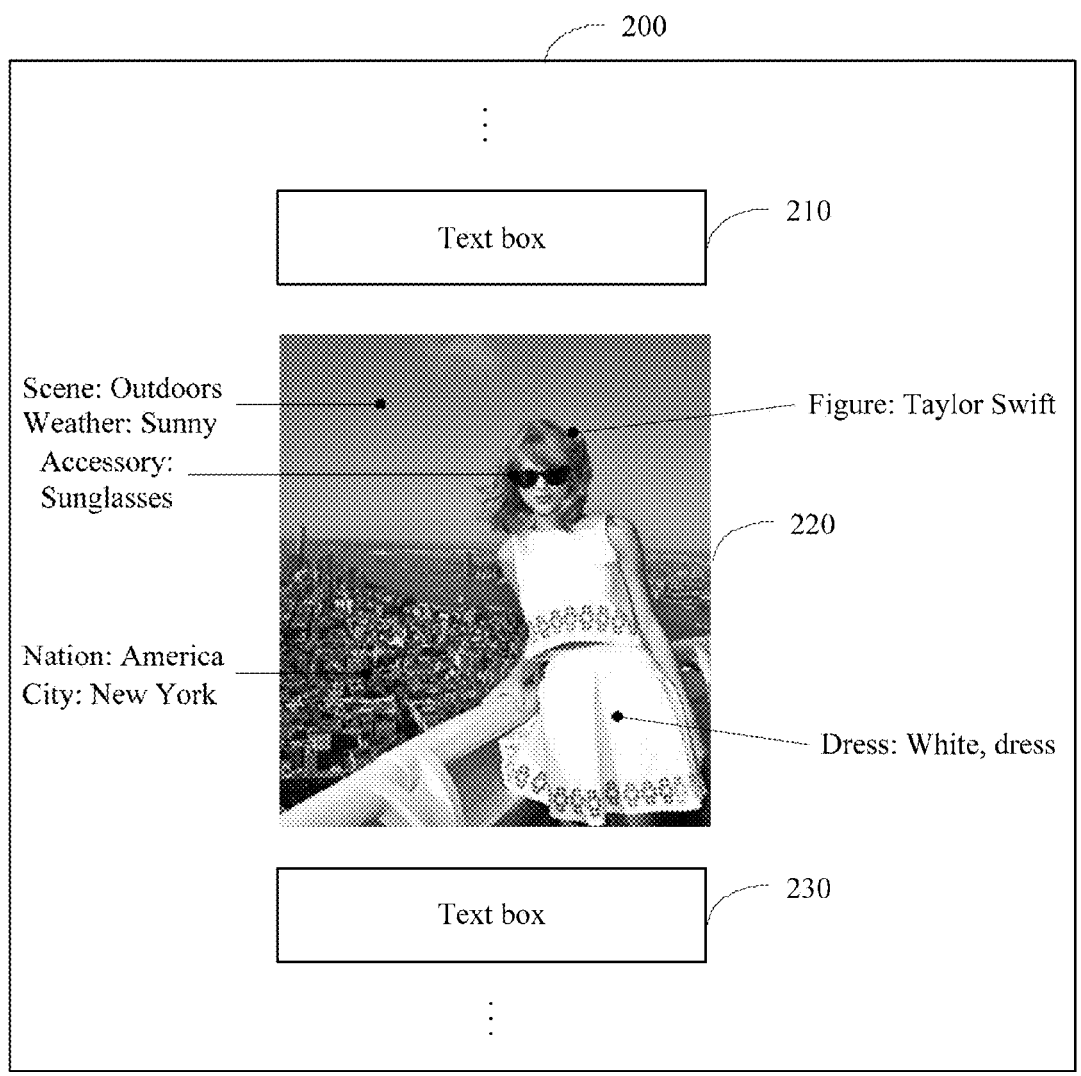
FIG. 2 is a schematic diagram of an interface for presenting an image file according to an embodiment of this application.

During one implementation, relevant pictures in addition to a text are displayed at the same time when the client presents information such as an article to the user, so that the user may understand content described in the article more. FIG. 2 is a schematic diagram of an interface for presenting an image file according to an embodiment of this application, and the presented image file is a picture. As shown in FIG. 2, an article of a theme of "From a countrified girl to a fashionable—Uncover dress evolutionary history of Taylor Swift" is presented in an interface 200. A picture received by the client from the server is displayed in a frame 220, and this picture is a picture of Taylor Swift in an outdoor landscape. Relevant text information is displayed in frames 210 and 230, and the above theme is described in combination with the picture in the frame 220.

In step 102, in response to an operation performed by a user on the image file, a media information presentation request carrying an identifier of the image file is sent to the server.

In this step, the operation performed by the user on the image file refers to a touch action of the user, and includes continuously clicking twice and continuing to press after the second click, or keeping pressing for a time exceeding a preset threshold. A specific form of the operation is specifically limited in this application, provided that the client correlates the operation and the media information presentation request.

After receiving the media information presentation request, the server searches the image file corresponding to the identifier from a plurality of saved image files according to the identifier of the image file, extracts a key word of the image file by analyzing the image file, and then performs matching between the key word of the image file and key word of each piece of media information, so as to determine one or more pieces of to-be-presented media information.

The key word of the image file or the key word of the media information may include any one or several of the following: a scene, a figure, a costume, weather, and a geographical area. The scene, the figure, the costume, the weather, and the geographical area correspond to types of the key word. Moreover, in each type, information of each key word may further include multiple layers of information according to a descending sequence of a scope of the information.

FIG. 3 is a schematic diagram of a classification list of key words according to an embodiment of this application. As shown in FIG. 3, types of the key word and corresponding multiple layers of information according to an embodiment of this application are listed. For example, when the type is the scene, the key word corresponds to two layers of information. First layer of information includes indoors and outdoors. Second layer of information of the indoors may further include an office area and a recreation area. Second layer of information of the outdoors may further include a high mountain, a sea, and grassland. Further for example, when the type is the costume, the key word corresponds to three layers of information, where first layer of information of the costume includes clothes, shoes, bags, and accessories; second layer of information of the clothes includes colors, dresses, trousers, and materials; and third layer of information of the dresses further includes longuette or skirts. Further for example, when the type is the geographical area, the key word corresponds to three layers of information, where first layer of information is a nation; second layer of information is a city; and third layer of information is a scenery spot. In view of the above, more layers indicate richer information of a represented key word.

If the picture shown in the frame 220 in FIG. 2 is analyzed, a plurality of extracted key words include that: the scene is outdoors and the figure is Taylor Swift; the costume further specifically includes that the cloth is a white dress, and the accessory is sunglasses; it is sunny; and the geographical area is New York, America.

In step 103, a notification message of to-be-presented media information that is determined by the server according to the identifier of the image file is received from the server, and the notification message includes brief information of the to-be-presented media information; and the brief information is presented to the user of the client.

In this step, the media information is promotion information. In correspondence to the picture shown in FIG. 2, the server determines, according to the picture, what promotion information needs to be presented. For example, the server determines that the presented promotion information may be a promotion video of New York tourism, a promotion video of the white dress, a promotion video of a weather forecast APP, or a promotion video of a new song of Taylor Swift.

The brief information, as a brief version of the promotion information, may be in a form of a picture (for example, a thumbnail image of a promotion video), an image with texts (for example, a thumbnail image and an abstract of a promotion video), or a video file (for example, an animation of a promotion video), so that the user can roughly understand content of the promotion information after browsing the brief information. During one implementation, the brief information is presented on the presented image file by using a floating layer. For example, the floating layer may appear on the image file in a direction from bottom to top, and is located at a lower end of the image file. Further for example, a location of the floating layer may not be fixed, for example, may be determined by a location of a relevant part on the image file. For example, the floating layer is displayed nearby the relevant part on the image file.

Figure 4A:
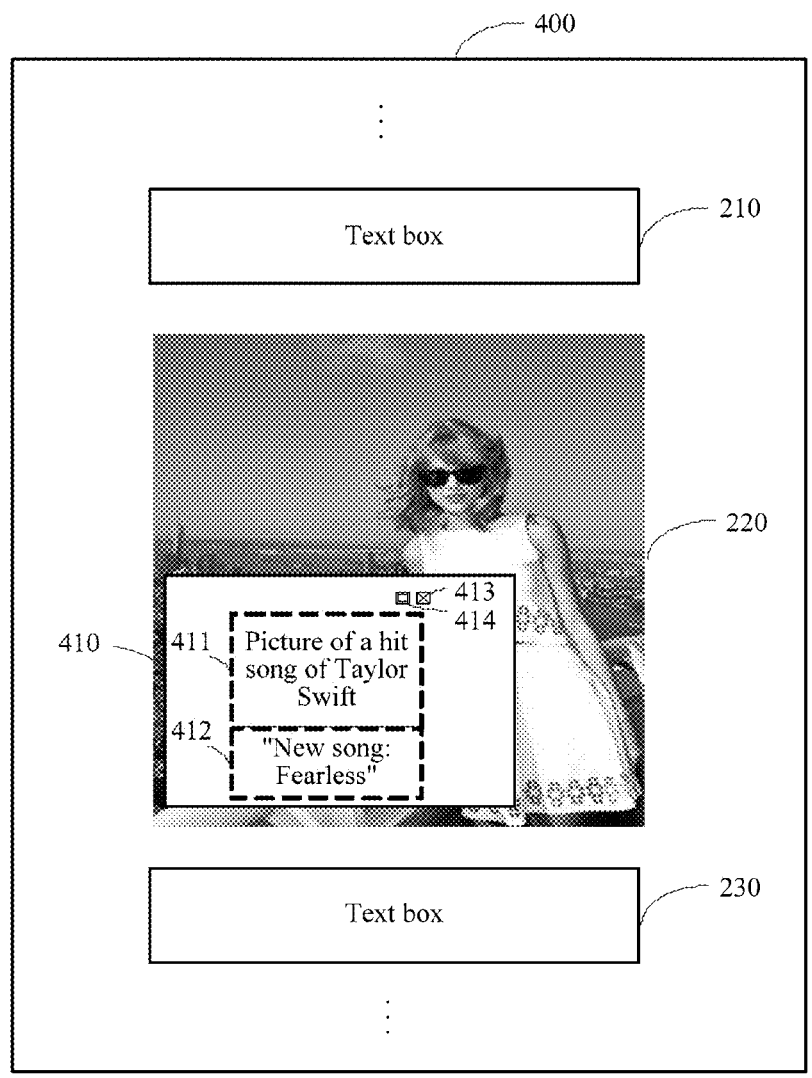
FIG. 4a is a schematic diagram of an interface for presenting brief information according to an embodiment of this application.

FIG. 4a is a schematic diagram of an interface for presenting brief information according to an embodiment of this application. On the picture 220 shown in FIG. 2, the brief information is displayed in a frame 410 in the form of an image with texts by using the floating layer. Media information to be presented is the promotion information "a promotion video of a new song of Taylor Swift". A thumbnail image "a picture of a hit song of Taylor Swift" is displayed in 411, and corresponding text information "new song: Fearless" is given in 412. In addition, a zoom-in button is output in 413, and an amplification button is output in 414, so that the user may operate on the presented brief information.

Optionally, to reflect that the brief information presented in the frame 410 corresponds to the promotion information rather than a part of the content of the article shown in FIG. 2, one piece of indication information may be further displayed in 410. That is, an identifier is added to indicate that the brief information corresponds to the promotion information rather than a common media file. For example, the identifier is a term of "advertisement", or may be a picture that can identify an advertisement, or an animation that can identify an advertisement, the specific form being not specifically defined in this application.

When the server determines multiple pieces of to-be-presented media information according to the identifier of the image file, the notification message carries brief information and presentation position information of each piece of to-be-presented media information. For each piece of to-be-presented media information, the brief information of the media information is presented according to the presentation position information of the media information. The presentation position information is used to specify a specific location for presenting the media information on the floating layer. The presentation position information may be carried in the notification message in a form of a placeholder. The placeholder may indicate a child window identifier indicating that a presentation position appears in the floating layer, and may define the length and the width of the presentation position.

Figure 4B:
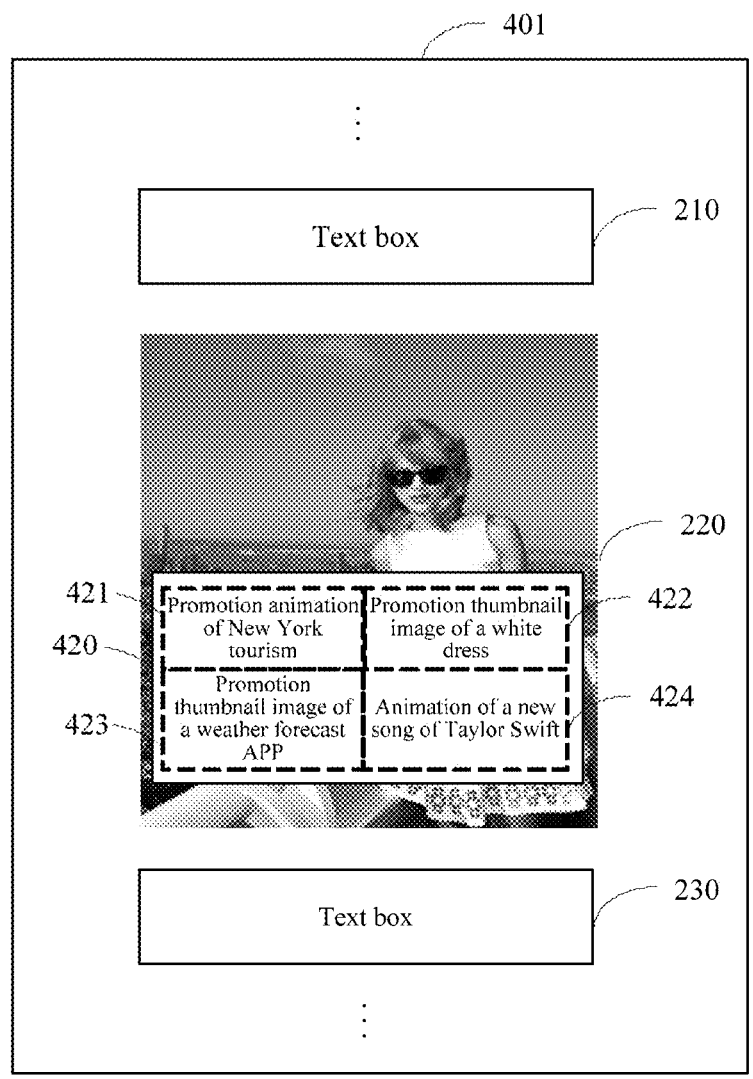
FIG. 4b is a schematic diagram of an interface for presenting brief information according to another embodiment of this application.

FIG. 4b is a schematic diagram of an interface for presenting brief information according to another embodiment of this application. When the brief information corresponds to one piece of promotion information, the presentation position may be considered to be an advertisement position of the promotion information. Based on the picture shown in FIG. 2, four child windows (that is, advertisement positions) are displayed on a floating layer 420, to display brief information of four piece of promotion information, that is, a list of recommended videos. For example, if promotion information 1 is the promotion video of New York tourism, it is shown in a child window 421 that brief information of the promotion information 1 is a promotion animation of New York tourism; if promotion information 2 is the promotion video of the white dress, it is shown in a child window 422 that brief information of the promotion information 2 is a promotion thumbnail image of the white dress; if promotion information 3 is the promotion video of a weather forecast APP, it is shown in a child window 423 that brief information of the promotion information 3 is a promotion thumbnail image of the weather forecast APP; and if promotion information 4 is the promotion video of a new song of Taylor Swift, it is shown in a child window 424 that brief information of the promotion information 4 is an animation of the new song of Taylor Swift. It should be noted that a location of each child window on the floating layer 420 shown in FIG. 4b is merely an example. During one implementation, each of the foregoing child windows may further be set at a location nearby a location of a part related thereto. For example, the promotion thumbnail image of the white dress may be displayed nearby the white dress on the picture; the animation of the new song of Taylor Swift is displayed nearby the figure shown on the picture; and the promotion video of the weather forecast APP and the promotion animation of New York tourism are displayed in the landscape that serves as a background of the picture. Location information of each part on the image file may be determined and recorded during a process in which the server analyzes the image. In this case, while key words on the image file are obtained, the location information of a corresponding part of the key word, for example, a location of a center of this part in the picture, is further recorded. Moreover, the presentation position information carried in the notification message may further include information about the location of the corresponding part in the picture.

In addition, in addition to the foregoing manner of multiple child windows being on one floating layer, in some embodiments of this application, multiple floating layers are presented at the same time according to that the notification message carries the brief information and the presentation position information of each piece of to-be-presented media information, each floating layer corresponding to the brief information of one piece of media information.

During one implementation, if the brief information of all the to-be-presented media information cannot be displayed on the floating layer 420 at the same time because the number of the to-be-presented media information is much great, the brief information of these to-be-presented media information can be sequentially presented on the floating layer 420 by means of sliding from right to left or sliding from top to bottom.

In step 104, a media file presentation request is sent to the server in response to an operation performed by the user on the brief information.

In this step, the operation performed by the user on the brief information includes that the user clicks or double clicks the brief information, or slides a finger in an area of a corresponding presentation position. For example, after browsing a native advertisement of one piece of promotion information, if the user is interested in the native advertisement and hopes to understand detailed content of the advertisement, the user may click a thumbnail image, an image with texts, or an animation of the native advertisement. In this case, the client sends the media file presentation request to the server to request to obtain a playing address of the media file of the advertisement. The playing address is also referred to as a landing page address of the advertisement, that is, a link address for playing an entire video of the advertisement.

In step 105, receive a link address of the media file from the server, the media file is associated with the media file presentation request, and obtain the media file according to the link address to present the media file to the user of the client.

In this step, the link address may be an address of a uniform resource locator (URL). The client obtains the video of the native advertisement according to URL address, and presents, on the presented media file, the image file by using a floating layer. Moreover, a playing operation option of the media file is provided for the user to watch.

In this embodiment, by receiving an image file from the server, and presenting the image file; and in response to an operation performed by a user on the image file, sending, to the server, a media information presentation request carrying an identifier of the image file, presentation of the native advertisement is triggered by the user, and a native advertisement that is closely combined with the content can be provided for the user, more satisfying interests and requests of the user.

Further, by receiving, from the server, a notification message for presenting one piece of media information, the notification message carrying brief information of the media information; presenting the brief information; sending a media file presentation request to the server in response to an operation performed by the user on the brief information; and receiving a link address of the media file that is returned by the server, and obtaining and presenting the media file according to the link address, a presentation manner of the advertisement, that is, the content, is implemented. The user can directly understand basic content of the advertisement when the brief information of the media information is presented, the user being deep impressed. The advertisement is played only when the user initiatively watches the advertisement, different from playing, without being allowed, a patch advertisement to the user like an inserted patch, thereby meeting the experience of the user for initiatively watching an advertisement video, and also improving resource utilization of the client.

Figure 5:
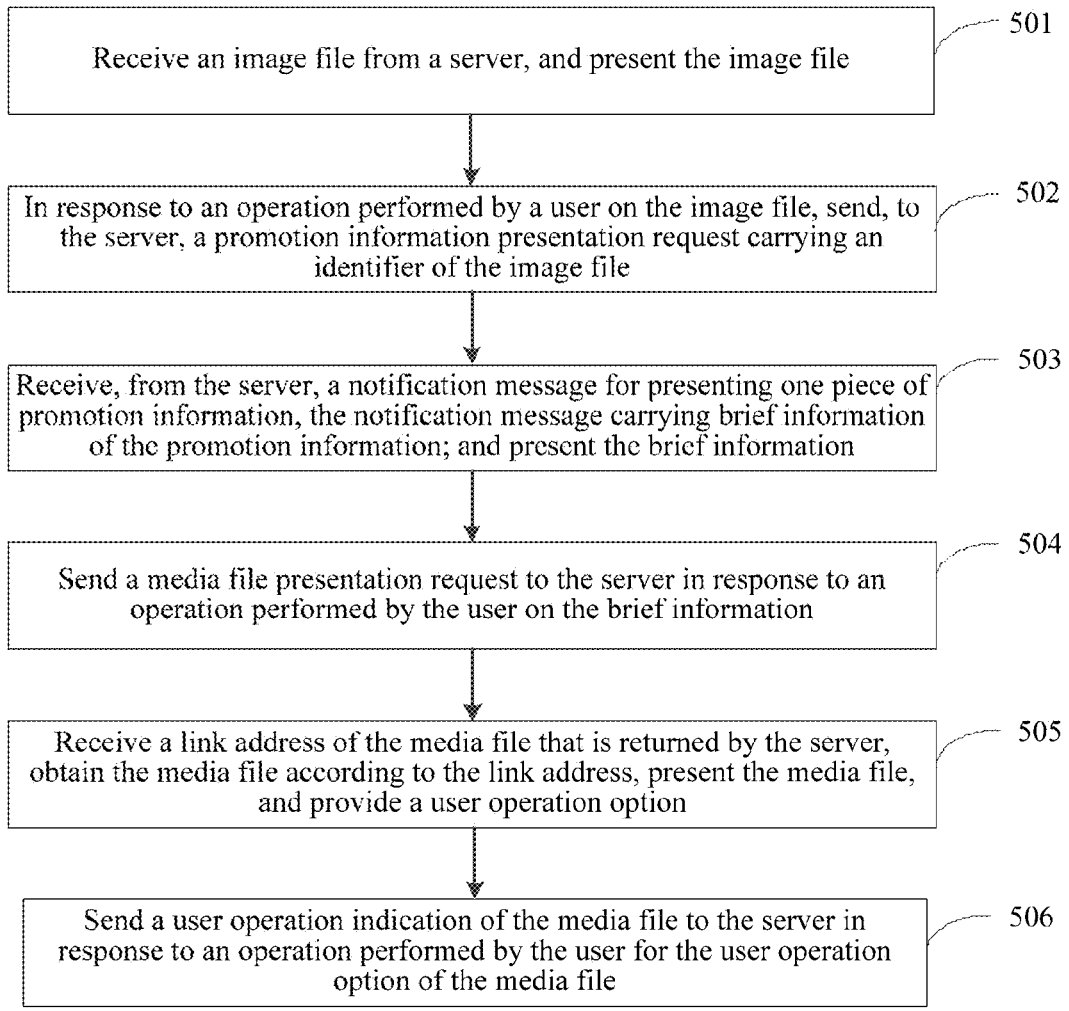
FIG. 5 is a schematic flowchart of a promotion information presentation method according to another embodiment of this application.

FIG. 5 is a schematic flowchart of a promotion information presentation method according to another embodiment of this application. The method is applied to a client. Referring to FIG. 5, the method includes:

In step 501, receive an image file from a server, and present the image file.

In step 502, in response to an operation performed by a user on the image file, send, to the server, a promotion information presentation request carrying an identifier of the image file.

In step 503, receive, from the server, a notification message for presenting one piece of promotion information, the notification message carrying brief information of the promotion information; and present the brief information.

In step 504, send a media file presentation request to the server in response to an operation performed by the user on the brief information.

Operations in steps 501 to 504 are same to those in steps 101 to 104, and the media information is specifically the promotion information. Reference may be made to the description in FIG. 1 for the exemplary operations, and details are not described herein again.

In step 505, receive a link address of the media file that is returned by the server, obtain the media file according to the link address, present the media file, and provide a user operation option.

The server receives media files uploaded by a provider (that is, an advertiser) of the promotion information, and generates a corresponding file identifier and a URL address for each media file. The server returns the URL address of the corresponding media file according to the identifier of the promotion information carried in the media file presentation request.

Figure 6:
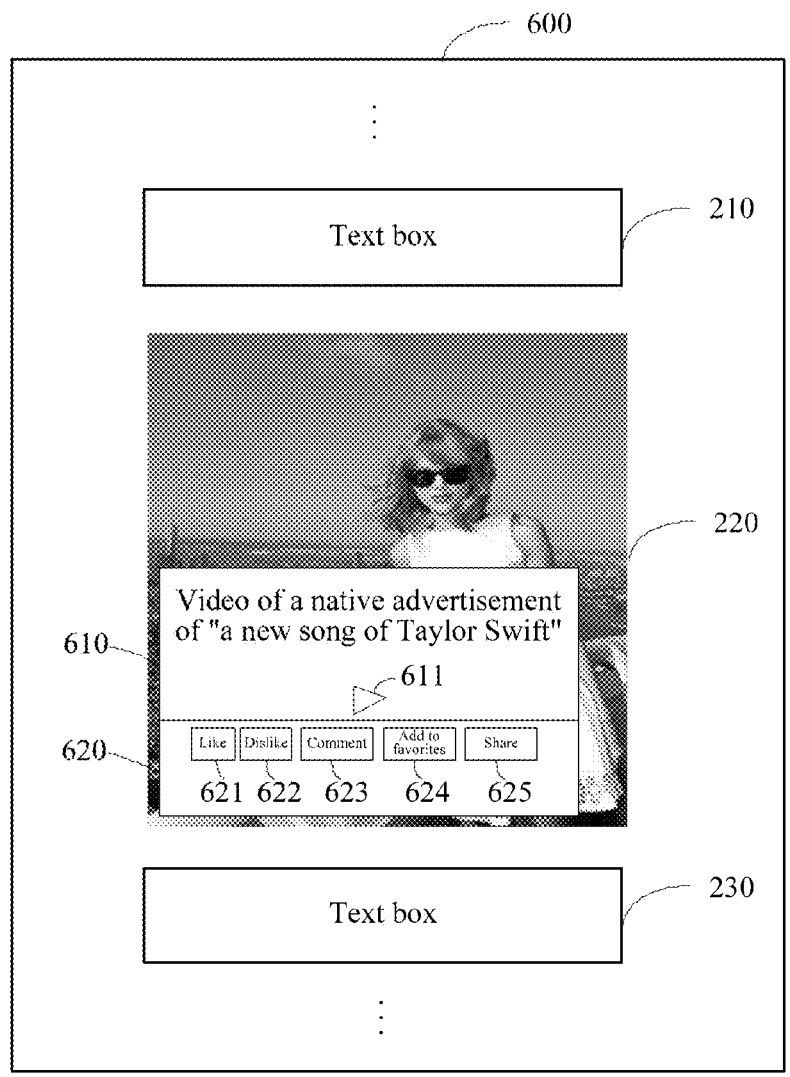
FIG. 6 is a schematic diagram of an interface for presenting a media file according to an embodiment of this application.

The user operation option include any one or any several of like, dislike, comment, add to favorites, and share. The user operation option is used to receive the operation performed by the user on the presented media file. FIG. 6 is a schematic diagram of an interface for presenting a media file according to an embodiment of this application. As shown in FIG. 6, a media file is played in a frame 610. The media file is a video of a native advertisement of "a new song of Taylor Swift", where 611 is a play button. Multiple user operation options are provided in a lower frame 620, including like 621, dislike 622, comment 623, add to favorites 624, and share 625.

The like 621, the dislike 622, and the comment 623 all have a function of making comments. The like 621 and the dislike 622 are used to count positive and negative comments of users on the native advertisement. Moreover, after the user clicks the comment 623, the client changes the interface to an interactive interface of user comments. In this interface, the user may input specific comment information, for example, may make comments on a text, a picture, or a small video; and the user may also browse and comment the comment information of other users, so as to implement social interactions among multiple users. For example, for each user in a comment area, options of like, dislike, and reply are provided for each piece of comment information.

In addition, share 625 in FIG. 6 are used for the user to share the promotion information to other friends or other public social platforms, such as moments of WeChat, QQzone, and Weibo.

In step 506, send a user operation indication of the media file to the server in response to an operation performed by the user for the user operation option of the media file.

The user operation indication is used to indicate an operation performed by the user on the media file, so that the server counts, based on a user operation indication received in a predetermined time period, the numbers of various operations performed on the media file. Herein, the user operation indication may carry the identifier of the media file, an identifier of the user, and an identifier of a user operation. The identifier of the user operation is in one-to-one correspondence to the user operation option, as the user operation option shown in FIG. 6.

In the foregoing embodiment, the promotion information presentation request carrying the identifier of the image file is sent to the server in response to the operation performed by the user on the image file; the notification message for presenting one piece of promotion information is received from the server, the notification message carrying the brief information of the promotion information; and the brief information is presented. In this way, an association between the image file and the promotion information is implemented, staying time of the user on a page is increased, and user viscosity is improved. Meanwhile, the advertiser is stimulated to upload more videos of the native advertisement, and promotion channels of the native advertisement are added.

In addition, the user operation option is provided while the media file is presented, so as to send the user operation indication of the media file to the server, so that the server may count the numbers of various operations performed by the user on the media file, thereby assessing promotion effects of the promotion information. More user operation options indicate a finer assessment result of the promotion effects. The assessment result may be provided to the advertiser to serve as a decision-making basis for advertisement placement, so as to increase return on investment of the advertiser and improve the resource utilization of the client. In addition, the user performs social sharing on content of the video by using various operation options, so that the advertisement is propagated more widely, and the return on investment of the advertiser is also further increased.

Figure 7:
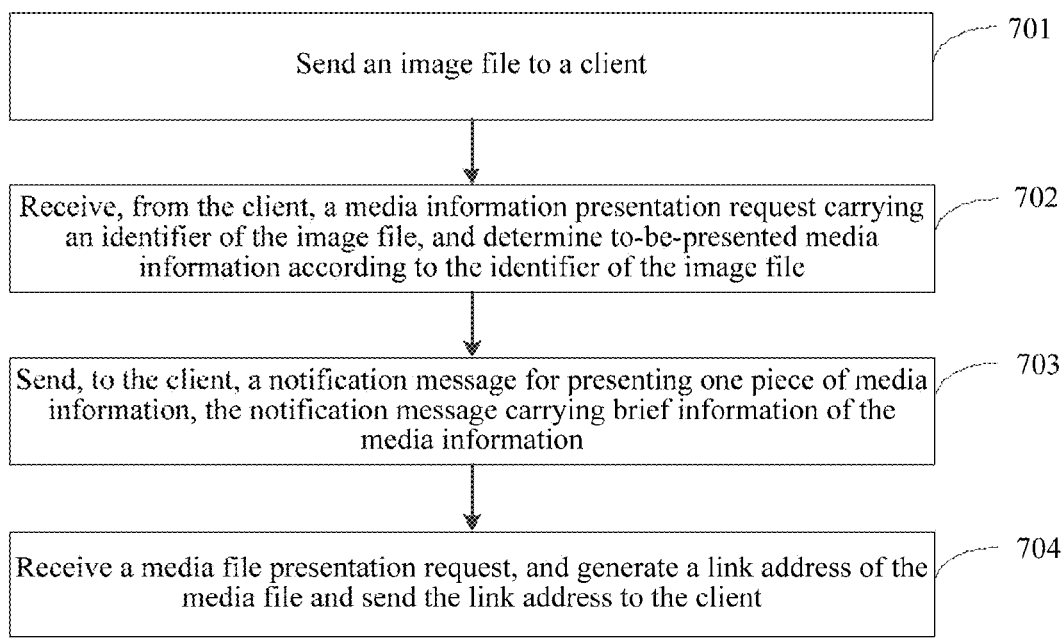
FIG. 7 is a schematic flowchart of a media information presentation method according to still another embodiment of this application.

FIG. 7 is a schematic flowchart of a media information presentation method according to still another embodiment of this application. The method is applied to a server. Referring to FIG. 7, the method includes:

In step 701, send an image file to a client, so that the client presents the image file.

In step 702, receive, from the client, a media information presentation request carrying an identifier of the image file, and determine to-be-presented media information according to the identifier of the image file.

In step 703, send, to the client, a notification message for presenting one piece of media information, the notification message carrying brief information of the media information.

The brief information of the media information may be generated by the user according to content of the media information. Alternatively, the brief information of the media information, such as a thumbnail image (for example, a picture of a cover poster), a title, an abstract, an animation, and a combination thereof, may be provided by a media information provider (for example, an advertiser) while uploading a video file of the media information.

After receiving the notification message, the client presents the brief information; receives, in response to an operation performed by the user on the brief information, an instruction of the media file presenting the media information; and sends a media file presentation request to the server.

In step 704, receive a media file presentation request, and generate a link address of the media file and send the link address to the client, so that the client obtains and presents the media file according to the link address.

According to this embodiment, a manner of promoting a native advertisement based on image information is implemented, meeting requirements on an advertisement income and also improving user experience. Therefore, a native video advertisement that is closely combined with the content is provided for the user.

Figure 8:
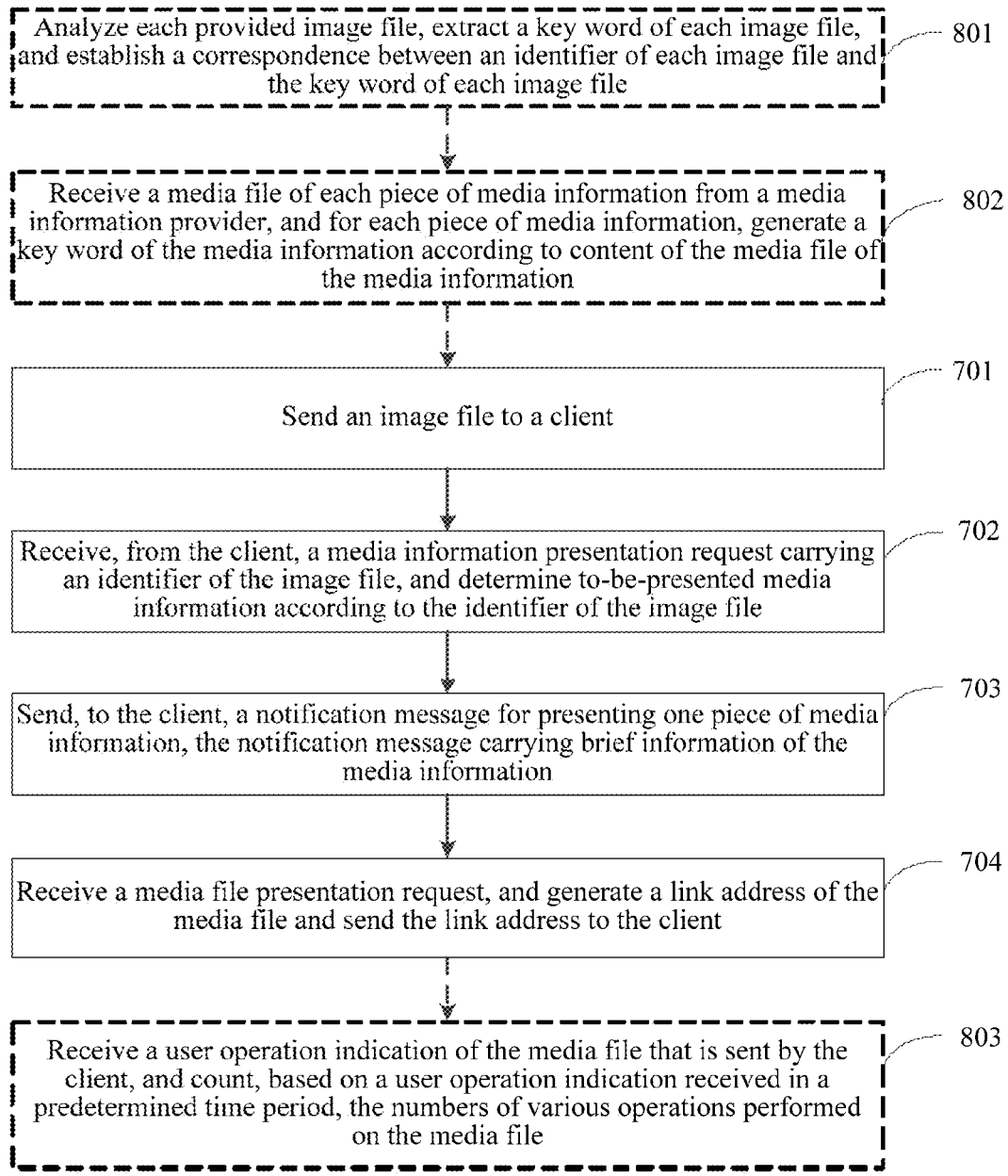
FIG. 8 is a schematic flowchart of a media information presentation method according to an embodiment of this application.

FIG. 8 is a schematic flowchart of a media information presentation method according to an embodiment of this application. The method is applied to a server. Referring to FIG. 8, before steps 701 to 704 shown in FIG. 7, the server respectively pre-processes each image file and each piece of media information. The method includes:

In step 801, analyze each provided image file, extract a key word of each image file, and establish a correspondence between an identifier of each image file and the key word of each image file.

In this step, analyzing the image file and extracting the key word of the image file specifically includes: dividing the image file, to obtain each component; identifying each component, and determining an object corresponding to each component; and explaining each object, to obtain a key word of each object as the key word of the image file.

Division of the image file may be taken as a decision-making process. An object and a component thereof are decomposed from an object scene image, the component being composed of image primitives. Algorithms for decision-making may be divided into image point technology and region technology. The image point technology is classifying image points by using a threshold method, for example, calculating strokes in a text image according to a comparison of a grey scale and a threshold of the image point. The region technology is detecting a border, a line, a region, and the like by using features such as a texture and a grey scale contrast of a local region, and obtaining each component of the image by using region growth, combination, and decomposition technologies.

During identifications of the components, for each component, a structure of the component is classified according to the shape and grey scale information of this component, and an object corresponding to the component is identified according to a classification result. Alternatively, for each component, the component is matched with a preset object model, and an object corresponding to the component is identified according to a matching result.

When explanation is made to each object, a hierarchical construction of the object scene may be established by using a heuristic method or an identification method combining human computer interaction technology, so as to describe what objects exist in the object scene, and what relationship is between the objects. If there is a three-dimensional object scene, knowledge of various known information of the object scene and a constraint relationship between the objects in the object scene may be used. For example, a surface direction of the three-dimensional object scene is deduced from a grey scale shade, a texture change, and the shape of a surface contour line; descriptions and explanations of the three-dimensional object scene may be obtained according to distance measurement data, or by means of calculating the scene depth from two-dimensional images in different angles.

The key word of each image file may be extracted through the foregoing processing of division, identification, and explanation. A classification list of key words shown in FIG. 3 is established according to all the key words. In a display page shown in FIG. 2, the image file presented by the client is an image file performed with the foregoing analysis.

In step 802, receive a media file of each piece of media information from a media information provider, and for each piece of media information, generate a key word of the media information according to content of the media file of the media information.

During one implementation, the server may generate the key word of the media information according to the obtained content of the media file, including multiple layers of information in classifications of a scene, a figure, a costume, weather, and a geographical area. Alternatively, the server may receive key word information input by a media information provider (for example, an advertiser) to serve as the key word of the media information. For example, the advertiser selects a corresponding key word from the classification list of key words shown in FIG. 3 for a video of each native advertisement when uploading the video of each native advertisement. In this way, the server obtains a key word corresponding to the content of the media file.

The server may alternatively first perform step 802 and then perform step 801.

In steps 701 to 704 are further performed after step 802 is performed. Specifically, the image file that is sent to the client in step 701 is the image file processed in step 801. In step 702, matching between the key word of the image file and the key word of each piece of media information is performed, and the media information is determined as the to-be-presented media information if a key word of one piece of media information matches the key word of the image file. Because each key word includes multiple layers of information in a descending sequence of scope. The foregoing matching may be divided into complete matching and partial matching. The complete matching refers to that the multiple layers of information of the key word of the image file is completely consistent with the multiple layers of information of the key word of one piece of media information, and it is considered that the media information is the to-be-presented media information. The partial matching refers to that partial information of the key word of the image file is consistent with partial information of the key word of one piece of media information. For example, the partial information refers to a first layer of information in the multiple layers of information. In view of the above, when the partial matching is performed, degree of association between the media information and the image file is lowered. In step 703, under limitation of the number of presentation positions of the promotion information displayed on a floating layer, if the number of the media information that matches the key word of the image file and that is obtained in step 702 is greater than the number of the presentation positions of the promotion information, media information of a quantity smaller than or equal to the number of the presentation positions of the promotion information may be selected from the matching media information according to the number of the presentation positions of the promotion information, and the brief information and the presentation position information are sent to the client by using the notification message of the media information. In some embodiments of this application, there may be multiple methods for selecting a number of media information from the matching media information. For example: completely matching media information may be preferentially selected; a random selection may be performed; if the media information has a priority, media information in a higher priority may be selected according to the priority of the media information; or a selection may be performed according to the number of presentations of the media information, so as to select media information that is rarely presented; or even a selection may be performed by comprehensively considering the foregoing multiple factors. However, if the number of the media information that matches the key word of the image file and that is obtained in step 702 is smaller than or equal to the number of the presentation positions of the promotion information, establishment information and presentation position information of these media information may be fed back, and are sent to the server by using the notification message.

Step 803 is further performed after step 704 is performed.

In step 803, receive a user operation indication of the media file that is sent by the client, and count, based on a user operation indication received in a predetermined time period, the numbers of various operations performed on the media file.

The user operation indication is used to indicate an operation performed by the user on the media file.

In the foregoing embodiment, the key word is generated by analyzing each image file and the content of each piece of media information by the server. The media information is combined with the image file by means that the key word serves as an intermediate value of the matching, so that the presented media information is associated in content with the image file that is presented before. Consequently, interests of the user that browses the image file may be led to more easily, so as to improve effects of presenting and promoting the media information, and improve a promotion income of the advertiser.

Figure 9:
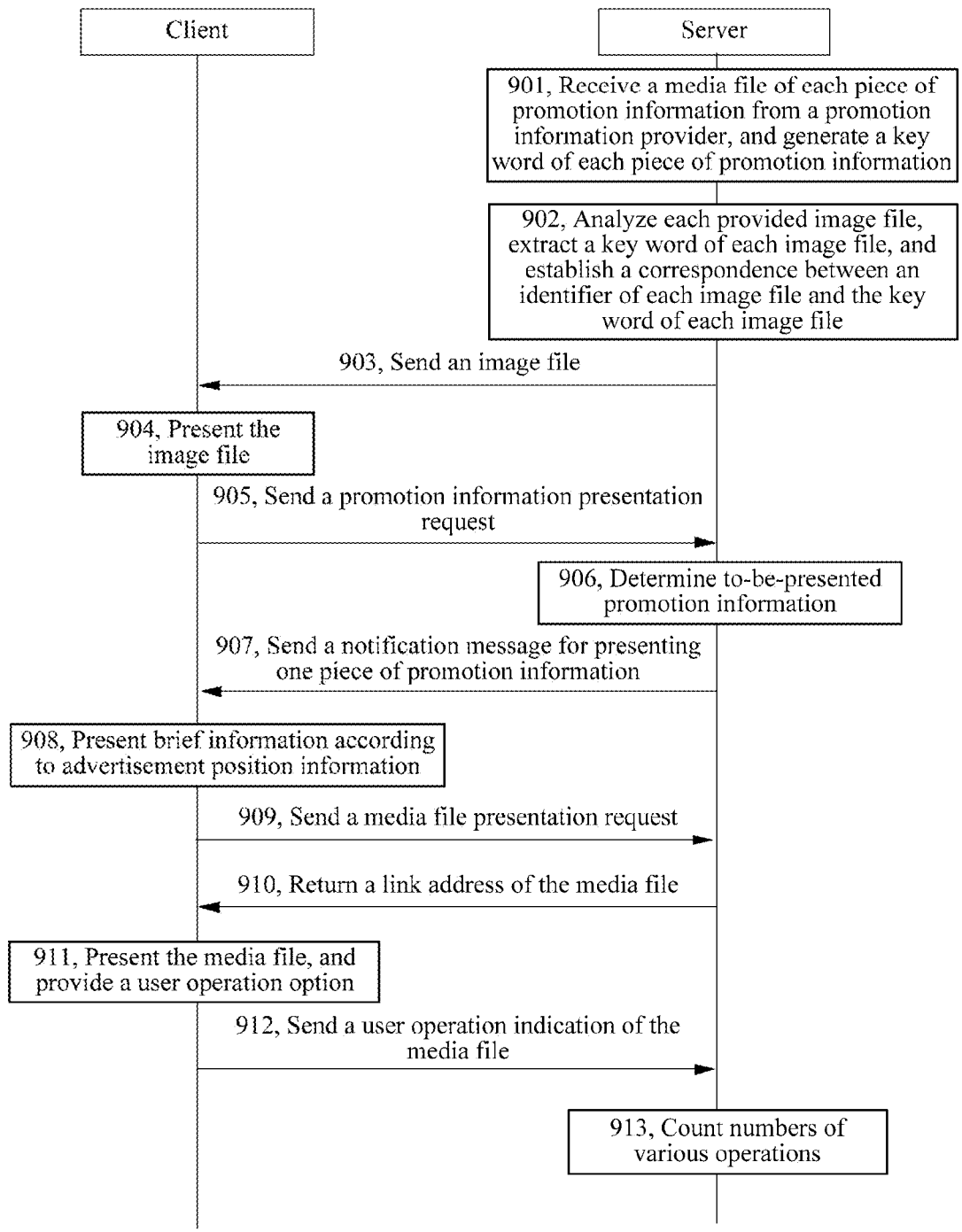
FIG. 9 is a schematic interaction diagram of a promotion information presentation method according to an embodiment of this application.

FIG. 9 is a schematic interaction diagram of a promotion information presentation method according to an embodiment of this application, including a client and a server. As shown in FIG. 9, the following steps are included:

In step 901, the server receives a media file of each piece of promotion information from a promotion information provider, and for each piece of promotion information, generates a key word of the promotion information according to content of the media file of the promotion information.

In step 902, the server analyzes each provided image file, extracts a key word of each image file, and establishes a correspondence between an identifier of each image file and the key word of each image file.

The server may alternatively first perform step 902 and then perform step 901.

In step 903, the server further sends an image file performed with an image analysis to the client.

In step 904, the client presents the image file.

In step 905, in response to an operation performed by a user on the image file, the client sends, to the server, a promotion information presentation request carrying an identifier of the image file.

In step 906, the server determines to-be-presented promotion information according to the identifier of the image file.

In step 907, the server sends, to the client, a notification message for presenting one piece of promotion information, the notification message carrying brief information and advertisement position information of the promotion information.

In step 908, the client presents the brief information according to the advertisement position information.

In step 909, in response to an operation performed by the user on the brief information, the client receives an instruction of the media file for presenting the promotion information, and sends a media file presentation request to the server.

In step 910, the server receives the media file presentation request, and generates a link address of the media file and sends the link address to the client.

In step 911, the client obtains the media file according to the link address, presents the media file, and provides a user operation option.

In step 912, the client receives a user operation indication of the media file that is sent to the server in response to an operation performed by the user for the user operation option of the media file.

In step 913, the server counts, based on a user operation indication received in a predetermined time period, the numbers of various operations performed on the media file.

It can be seen from the foregoing technical solution that by using the method provided in this application, presentation of the media information is triggered by the user, and media information that is closely combined with content of the image file can be provided for the user, more satisfying interests and requests of the user. Moreover, the user can directly understand basic content when the brief information of the media information is presented. The media file of the media information is played only when the user initiatively watches the media file, different from playing to the user without being allowed like an inserted patch, thereby improving user experience when the media information is presented, and improving resource utilization of the client.

Figure 10:
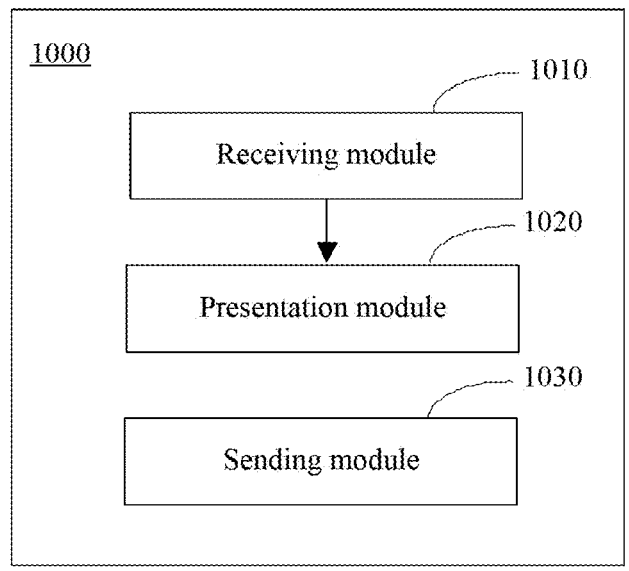
FIG. 10 is a schematic structural diagram of a client according to an embodiment of this application.

FIG. 10 is a schematic structural diagram of a client 1000 according to an embodiment of this application. As shown in FIG. 10, the client 1000 includes:

a receiving module 1010, configured to: receive an image file from a server; receive, from the server, a notification message for presenting one piece of media information, the notification message carrying brief information of the media information; and receive a link address of the media file that is returned by the server;

a presentation module 1020, configured to: present the image file received by the receiving module 1010; present the brief information received by the receiving module 1010; and obtain and present the media file according to the link address received by the receiving module 1010; and a sending module 1030, configured to: in response to an operation performed by a user on the image file, send, to the server, a media information presentation request carrying an identifier of the image file, so that the server determines to-be-presented media information according to the identifier of the image file; and send a media file presentation request to the server in response to an operation performed by the user on the brief information.

In an embodiment, when the server determines multiple pieces of to-be-presented media information according to the identifier of the image file, the notification message carries brief information and presentation position information of each piece of to-be-presented media information. Correspondingly, the presentation module 1020 is configured to: for each piece of to-be-presented media information, present the brief information of the media information according to the presentation position information of the media information.

In an embodiment, the presentation module 1020 is configured to present the brief information on the presented image file by using a floating layer; and/or present the media file on the presented image file by using a floating layer.

In an embodiment, the presentation module 1020 is further configured to provide a user operation option for the media file when the media file is presented.

Correspondingly, the sending module is 1030 further configured to send a user operation indication of the media file to the server in response to an operation performed by a user for the user operation option of the media file, where the user operation indication is used to indicate an operation performed by the user on the media file, so that the server counts, based on a user operation indication received in a predetermined time period, the numbers of various operations performed on the media file.

Figure 11:
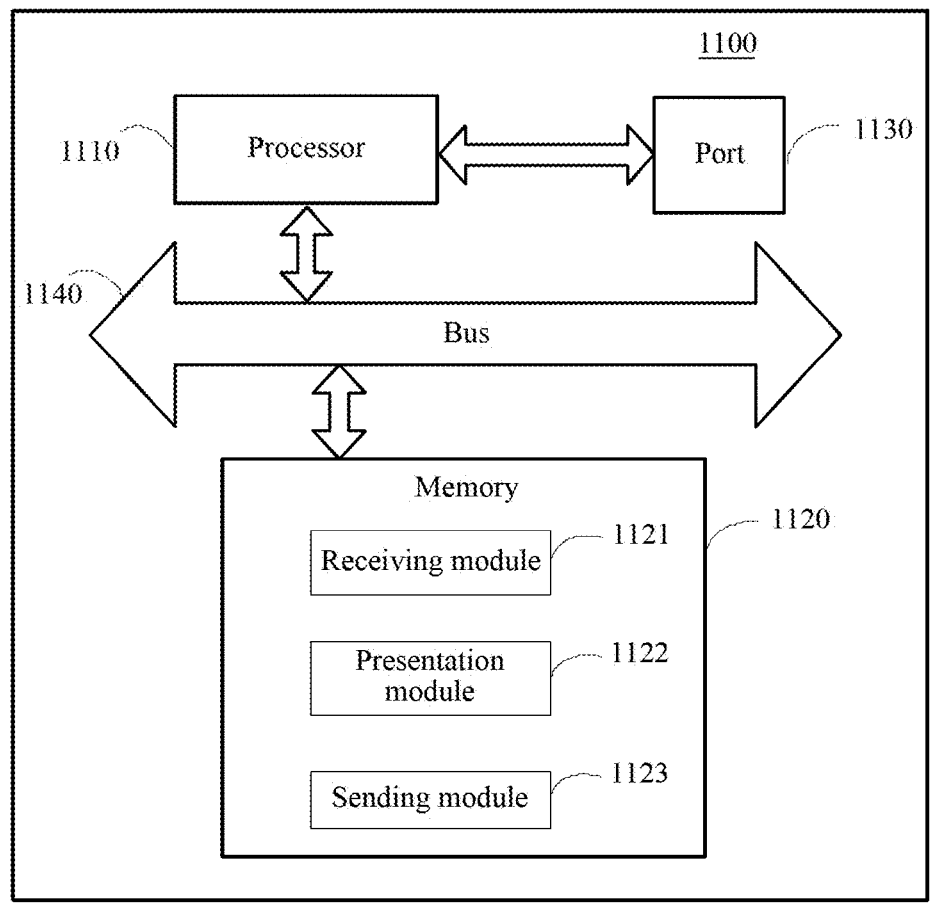
FIG. 11 is a schematic structural diagram of a client according to another embodiment of this application.

FIG. 11 is a schematic structural diagram of a client 1100 according to another embodiment of this application. The server 1100 of a media file permission includes: a processor 1110, a memory 1120, a port 1130, and a bus 1140. The processor 1110 and the memory 1120 are connected to each other by using the bus 1140. The processor 1110 may receive and send data by using the port 1130.

The processor 1110 is configured to implement a machine readable instruction stored by the memory 1120.

The memory 1120 stores the machine readable instruction that may be implemented by the processor 1110.

Specifically, in some embodiments of this application, the foregoing memory 1120 stores one or more programs, and is configured to be implemented by one or more processors 1110. The one or more programs may include the following instruction modules:

a receiving module 1121, a presentation module 1122, and a sending module 1123.

When implemented by the processor 1110, the receiving module 1121 may: receive an image file from a server; receive, from the server, a notification message for presenting one piece of media information, the notification message carrying brief information of the media information; and receive a link address of the media file that is returned by the server.

When implemented by the processor 1110, the presentation module 1122 may: present the image file received by the receiving module 1121; present the brief information received by the receiving module 1121; and obtain and present the media file according to the link address received by the receiving module 1121.

When implemented by the processor 1110, the sending module 1123 may: in response to an operation performed by a user on the image file, send, to the server, a media information presentation request carrying an identifier of the image file, so that the server determines to-be-presented media information according to the identifier of the image file; and send a media file presentation request to the server in response to an operation performed by the user on the brief information.

In view of the above, when the instruction modules stored in the memory 1120 are implemented by the processor 1110, various functions of the receiving module, the presentation module, and the sending module in the foregoing embodiments may be achieved.

Figure 12:
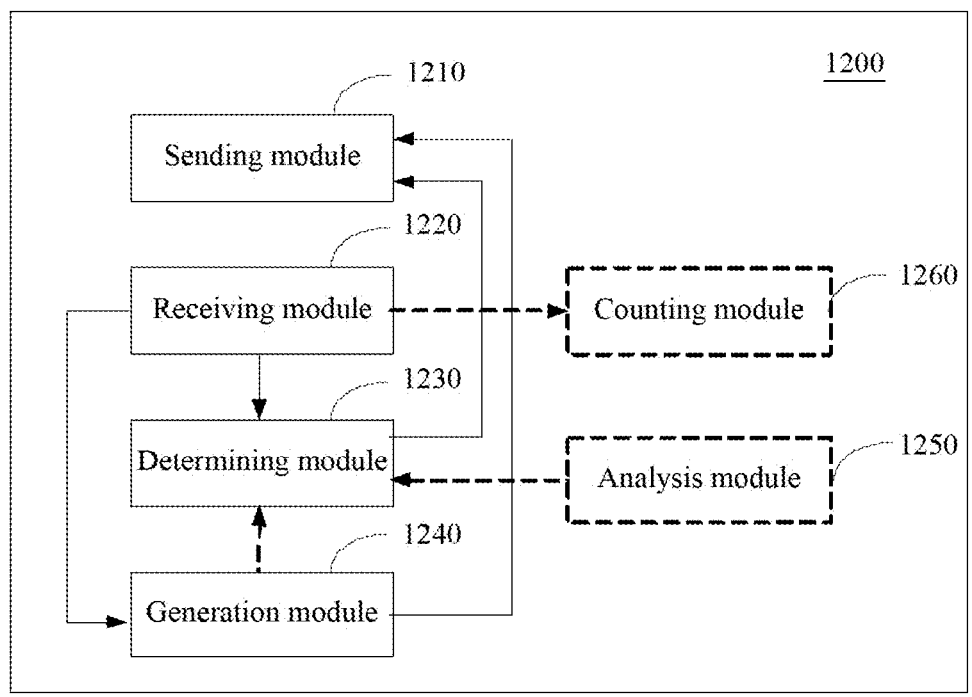
FIG. 12 is a schematic structural diagram of a server according to an embodiment of this application.

FIG. 12 is a schematic structural diagram of a server 1200 according to an embodiment of this application. As shown in FIG. 12, the server 1200 includes: a sending module 1210, a receiving module 1220, a determining module 1230, and a generation module 1240.

The sending module 1210 is configured to: send an image file to a client, so that the client presents the image file; send, to the client, a notification message for presenting one piece of media information, the notification message carrying brief information of the media information determined by the determining module 1230, so that the client presents the brief information; send a media file presentation request to the server in response to an operation performed by a user on the brief information; and send a link address generated by the generation module 1240 to the client, so that the client obtains and presents the media file according to the link address.

The receiving module 1220 is configured to: receive, from the client, a media information presentation request carrying an identifier of the image file; and receive the media file presentation request.

The determining module 1230 is configured to determine to-be-presented media information according to the identifier of the image file received by the receiving module 1220.

The generation module 1240 is configured to generate the link address of the media file according to the media file presentation request received by the receiving module 1220.

In an embodiment, the server 1200 further includes:

an analysis module 1250, configured to: analyze each provided image file, extract a key word of each image file, and establish a correspondence between an identifier of each image file and the key word of each image file.

The receiving module 1220 is further configured to receive a media file of each piece of media information from a media information provider.

The generation module 1240 is further configured to: for each piece of media information, generate a key word of the media information according to content of the media file of the media information received by the receiving module 1220.

The determining module 1230 is configured to: determine a key word of the image file according to the identifier of the image file and the correspondence obtained by the analysis module 1250; and perform matching between the key word of the image file and the key word of each piece of media information generated by the generation module 1240, and determine, if a key word of one piece of media information matches the key word of the image file, the media information as the to-be-presented media information.

In an embodiment, the analysis module 1250 is configured to: divide the image file, to obtain each component; identify each component, and determine an object corresponding to each component; and explain each object, to obtain a key word of each object as the key word of the image file.

In an embodiment, the receiving module 1220 is further configured to receive a user operation indication of the media file that is sent by the client, where the user operation indication is used to indicate an operation performed by the user on the media file.

Correspondingly, the server 1200 further includes:

a counting module 1260, configured to count, based on a user operation indication received by the receiving module 1220 in a predetermined time period, the numbers of various operations performed on the media file.

Figure 13:
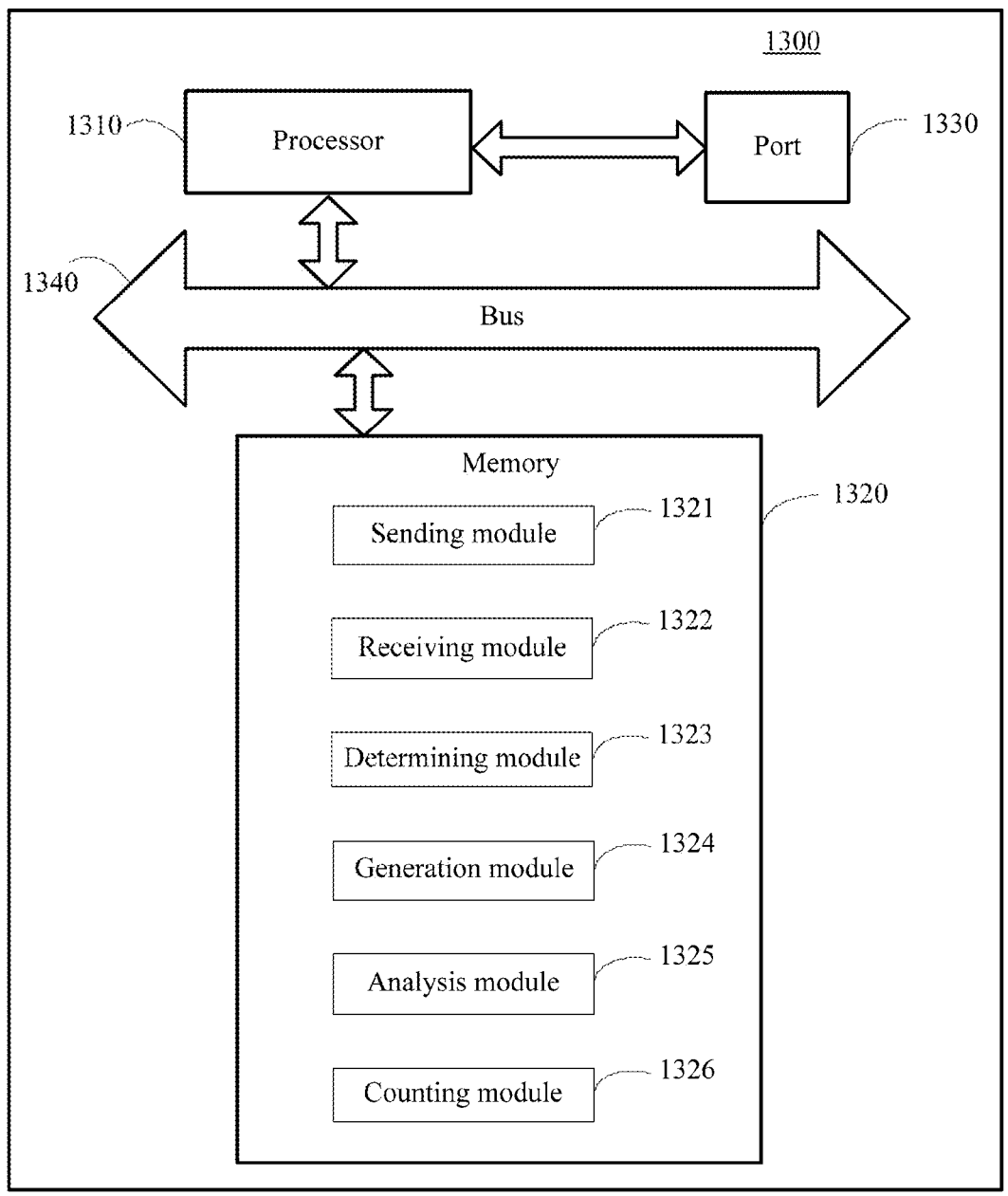
FIG. 13 is a schematic structural diagram of a server according to another embodiment of this application.

FIG. 13 is a schematic structural diagram of a server 1300 according to still another embodiment of this application. The server 1300 of a media file permission includes: a processor 1310, a memory 1320, a port 1330, and a bus 1340. The processor 1310 and the memory 1320 are connected to each other by using the bus 1340. The processor 1310 may receive and send data by using the port 1330.

The processor 1310 is configured to implement a machine readable instruction stored by the memory 1320.

The memory 1320 stores the machine readable instruction that may be implemented by the processor 1310.

Specifically, in some embodiments of this application, the foregoing memory 1320 stores one or more programs, and is configured to be implemented by one or more processors 1310.

The one or more programs may include the following instruction modules: a sending module 1321, a receiving module 1322, a determining module 1323, and a generation module 1324.

When implemented by the processor 1310, the sending module 1321 may: send an image file to a client, so that the client presents the image file; send, to the client, a notification message for presenting one piece of media information, the notification message carrying brief information of the media information determined by the determining module 1323, so that the client presents the brief information; send a media file presentation request to the server in response to an operation performed by a user on the brief information; and send a link address generated by the generation module 1324 to the client, so that the client obtains and presents the media file according to the link address.

When implemented by the processor 1310, the receiving module 1322 may: receive, from the client, a media information presentation request carrying an identifier of the image file; and receive the media file presentation request.

When implemented by the processor 1310, the determining module 1323 may: determine to-be-presented media information according to the identifier of the image file received by the receiving module 1322.

When implemented by the processor 1310, the generation module 1324 may: generate the link address of the media file according to the media file presentation request received by the receiving module 1322.

In addition, instruction modules that may be implemented by the processor 1310 may further include: an analysis module 1325 and a counting module 1326. Specifically, in an embodiment, when implemented by the processor 1310, the analysis module 1325 may: analyze each provided image file, extract a key word of each image file, and establish a correspondence between an identifier of each image file and the key word of each image file;

when implemented by the processor 1310, the receiving module 1322 may further: receive a media file of each piece of media information from a media information provider; and when implemented by the processor 1310, the generation module 1324 may further: for each piece of media information, generate a key word of the media information according to content of the media file of the media information received by the receiving module 1322.

Correspondingly, when implemented by the processor 1310, the determining module 1323 may: determine a key word of the image file according to the identifier of the image file and the correspondence obtained by the analysis module 1325; and perform matching between the key word of the image file and the key word of each piece of media information generated by the generation module 1324, and determine, if a key word of one piece of media information matches the key word of the image file, the media information as the to-be-presented media information.

In an embodiment, when implemented by the processor 1310, the analysis module 1325 may: divide the image file, to obtain each component; identify each component, and determine an object corresponding to each component; and explain each object, to obtain a key word of each object as the key word of the image file.

In an embodiment, when implemented by the processor 1310, the counting module 1326 may: count, based on a user operation indication received by the receiving module 1322 in a predetermined time period, the numbers of various operations performed on the media file.

In view of the above, when the instruction modules stored in the memory 1320 are implemented by the processor 1310, various functions of the receiving module, the generation module, the determining module, the sending module, the analysis module, and the counting module in the foregoing embodiments may be achieved.

In the foregoing device embodiments, specific methods for each module and unit to implement respective functions are described in the method embodiments, and details are not described herein again.

In addition, functional units in the embodiments of this application may be integrated into one processing unit, or each of the modules may exist alone physically, or two or more modules are integrated into one unit. The integrated unit may be implemented in a form of hardware, or may be implemented in a form of a software functional unit.

In addition, each embodiment of this application may be implemented by using a data process apparatus such as a data processing program implemented by a computer. Obviously, the data processing program constitutes this application. In addition, usually a data processing program stored in a storage medium is implemented by directly reading the program from the storage medium or by installing or copying the program to a storage apparatus (for example, a hard disk or a main memory) of the data process apparatus. Therefore, such storage medium also constitutes this application. The storage medium may use any type of recording manner, such as a paper storage medium (for example, a paper tape), a magnetic storage medium (for example, a floppy disk, a hard disk, or a flash memory), an optical storage medium (for example, a CD-ROM), or a magneto-optical storage medium (for example, an MO).

Therefore, this application further discloses a storage medium, such as a non-transitory computer-readable medium that stores a data processing program. The data processing program is configured to implement any embodiment of the foregoing method in this application.

The foregoing descriptions are merely embodiments of this application, but are not intended to limit this application. Any modification, equivalent replacement, and improvement made without departing from the spirit and principle of this application shall fall within the protection scope of this application.

What is claimed is:

1. A non-transitory computer-readable medium storing a program executable by a processor of a client to perform:
   receiving an image file from a server;
   presenting the image file to a user of the client;
   in response to an operation performed by the user on the image file, sending a media information presentation request to the server, the media information presentation request including an identifier of the image file;
   receiving, from the server, a notification message of to-be-presented media information that is determined by the server according to the identifier of the image file, the notification message including brief information of the to-be-presented media information;
   presenting the brief information to the user of the client;
   sending a media file presentation request to the server in response to an operation performed by the user on the brief information;
   receiving a link address of a media file from the server, the media file being associated with the media file presentation request;
   obtaining the media file according to the link address; and
   presenting the media file to the user of the client, wherein
   the image file is analyzed, a key word that is associated with the image file is extracted, and a correspondence between an identifier of the image file and the key word that is associated with the image file is established by the server,
   for each of a plurality of media information received by the server from a media information provider, a key word that is associated with the respective media information is generated by the server according to content of a media file of the respective media information, and
   one of the plurality of media information is determined as the to-be-presented media information when the key word of the one of the plurality of media information matches the key word associated with the image file.

2. The non-transitory computer-readable medium according to claim 1, wherein when the to-be-presented media information includes a plurality of pieces of to-be-presented media information,
   the notification message includes the brief information and presentation position information for the pieces of the to-be-presented media information; and
   the presenting the brief information includes presenting the brief information for the pieces of the to-be-presented media information according to the presentation position information for the pieces of the to-be-presented media information.

3. The non-transitory computer-readable medium according to claim 1, wherein the presenting the brief information comprises:
   presenting the brief information on the presented image file in a floating layer.

4. The non-transitory computer-readable medium according to claim 1, wherein the presenting the media file comprises:
   presenting the media file on the presented image file in a floating layer.

5. The non-transitory computer-readable medium according to claim 1, further comprising:
   providing a user operation option for the media file when the media file is presented; and
   sending a user operation indication of the media file to the server in response to an operation performed by the user for the user operation option of the media file, wherein
   the user operation indication indicates an operation performed by the user on the media file, and
   the server counts, based on a number of user operation indications received in a predetermined time period, a number of various operations performed on the media file.

6. The non-transitory computer-readable medium according to claim 1, wherein the presenting the image file comprises:
   presenting an article that includes the image file to the user of the client.

7. The non-transitory computer-readable medium according to claim 1, wherein the brief information includes an image associated with the to-be-presented media information.

8. The non-transitory computer-readable medium according to claim 1, wherein the presenting the brief information comprises:
   presenting the brief information to the user of the client in a media file selection interface.

9. A media information presentation method, the method comprising:
   analyzing an image file, extracting a key word that is associated with the image file, and establishing a correspondence between an identifier of the image file and the key word that is associated with the image file;
   receiving a media file for each of a plurality of media information from a media information provider;
   for each of the plurality of media information, generating a key word that is associated with the respective media information according to content of the media file of the respective media information;
   sending the image file to a client for presentation to a user of the client;
   receiving, from the client, a media information presentation request including the identifier of the image file;
   determining to-be-presented media information according to the identifier of the image file;
   sending, to the client, a notification message of the to-be-presented media information, the notification message including brief information of the to be presented media information;
   receiving a media file presentation request from the client when the user performs an operation on the brief information;

generating a link address of the media file that is associated with the media file presentation request; and sending the link address of the media file to the client, the media file being obtained by the client according to the link address for presentation to the user of the client, wherein;

the determining the to-be-presented media information according to the identifier of the image file includes determining, when the key word of one of the plurality of media information matches the key word associated with the image file, the one of the plurality of media information as the to-be-presented media information.

10. The method according to claim 9, wherein the determining the to-be-presented media information according to the identifier of the image file comprises:

determining the key word associated with the image file according to the identifier of the image file and the established correspondence; and performing matching between the key word associated with the image file and the key word of each of the plurality of media information.

11. The method according to claim 9, wherein the analyzing the image file and extracting the key word associated with the image file comprises:

dividing the image file, to obtain each component;
identifying each component;
determining an object corresponding to each component; and
identifying each object, to obtain a key word associated with the respective object as at least one key word of the image file.

12. The method according to claim 9, further comprising:

receiving a user operation indication of the media file that is sent by the client, the user operation indication indicates an operation performed by the user on the media file; and counting, based on a number of user operation indications received in a predetermined time period, a number of various operations performed on the media file.

13. The method according to claim 9, wherein the image file is included in an article that is presented to the user of the client.

14. The method according to claim 9, wherein the brief information is presented to the user of the client in a media file selection interface.

15. A server, comprising:

processing circuitry configured to analyze an image file, extract a key word that is associated with the image file, and establish a correspondence between an identifier of the image file and the key word that is associated with the image file;

receive a media file for each of a plurality of media information from a media information provider;

for each of the plurality of media information, generate a key word that is associated with the respective media information according to content of the media file of the respective media information;

send the image file to a client for presentation to a user of the client;

receive, from the client, a media information presentation request including the identifier of the image file;

determine to-be-presented media information according to the identifier of the image file;

send, to the client, a notification message of the to-be-presented media information, the notification message including brief information of the to-be-presented media information;

receive a media file presentation request from the client when the user performs an operation on the brief information;

generate a link address of the media file that is associated with the media file presentation request; and send the link address of the media file to the client, the media file being obtained by the client according to the link address for presentation to the user of the client, wherein;

the processing circuitry is configured to determine, when the key word of one of the plurality of media information matches the key word associated with the image file, the one of the plurality of media information as the to-be-presented media information.

16. The server according to claim 15, wherein the processing circuitry configured to determine the key word associated with the image file according to the identifier of the image file and the established correspondence; and perform matching between the key word associated with the image file and the key word of each of the plurality of media information.

17. The server according to claim 15, wherein the processing circuitry is configured to:

divide the image file, to obtain each component;
identify each component;
determine an object corresponding to each component; and
identifying each object, to obtain a key word associated with the respective object as at least one key word of the image file.

18. The server according to claim 15, wherein the processing circuitry is further configured to receive a user operation indication of the media file that is sent by the client, the user operation indication indicates an operation performed by the user on the media file; and count, based on a number of user operation indications received in a predetermined time period, a number of various operations performed on the media file.

19. The server according to claim 15, wherein the image file is included in an article that is presented to the user of the client.

20. The server according to claim 15, wherein the brief information is presented to the user of the client in a media file selection interface.

* * * * *